United States Patent
Chiou

(10) Patent No.: US 8,212,396 B2
(45) Date of Patent: Jul. 3, 2012

(54) APPARATUS POWER RESTART METHOD IN RESPONSE TO NETWORK CONNECTION STATUS

(76) Inventor: Shih-Chien Chiou, Taipei (TW)

( * ) Notice: Subject to any disclaimer, the term of this patent is extended or adjusted under 35 U.S.C. 154(b) by 657 days.

(21) Appl. No.: 12/289,286

(22) Filed: Oct. 24, 2008

(65) Prior Publication Data

US 2010/0102631 A1    Apr. 29, 2010

(51) Int. Cl.
*H02J 3/14*    (2006.01)
(52) U.S. Cl. ......................................................... 307/39
(58) Field of Classification Search ...................... 307/39
See application file for complete search history.

(56) References Cited

U.S. PATENT DOCUMENTS

| | | | |
|---|---|---|---|
| 6,910,136 B1 * | 6/2005 | Wasserman et al. | 726/4 |
| 7,245,044 B2 * | 7/2007 | Woltereck et al. | 307/29 |
| 7,546,479 B2 * | 6/2009 | Saputro et al. | 713/330 |

* cited by examiner

*Primary Examiner* — Hal Kaplan

(74) *Attorney, Agent, or Firm* — Rosenberg, Klein & Lee

(57) ABSTRACT

An apparatus power restart method in response to the network connection status is provided. The method uses an outlet or an Uninterruptible Power Supply ("UPS") with multiple sockets, wherein a network port and a power reset switch are included. The outlet or UPS is powered via an external power source. A network connection is established through one or more network devices. The electric power control apparatus incorporating the claimed power restart method includes a network connection detection circuit and an electric power control circuit. By monitoring the network connection, the network devices connected to the electric power control apparatus can be restarted in sequence or simultaneously when the network connection fails. Thereby the network connection can be maintained. Additionally, the electric power control apparatus has a server module whereby the users can access the apparatus via the network connection. This allows the user to configure the apparatus.

13 Claims, 4 Drawing Sheets

APPARATUS POWER RESTART METHOD IN RESPONSE TO NETWORK CONNECTION STATUS

BACKGROUND OF THE INVENTION

1. Field of the Invention

The present invention relates to an apparatus power restart method that utilizes network disconnection status detection; in particular, the present invention relates to a configuration of a network connection detection circuit in a power control apparatus in order to control power switching of connected devices based on the network connection status.

2. Description of Related Art

Taking as an example the most commonly used network connection approach at present, Asymmetric Digital Subscriber Line (ADSL), whereby a user uses a modem, also known as ATU-R (ADSL Terminal Unit-Remote), to connect to the gateway of an Internet Service Provider (ISP) through telephone lines, thereby connecting to the Internet. If stable connections need to be maintained over prolonged periods of time such as during website installation or large data download, then the quality of the network connection may not be sufficient in the case of general home-use network devices such as a conventional modem or a conventional network sharer.

FIG. 1 is a schematic connection diagram showing various general home-used network devices according to the prior art, wherein a router 12 and a modem 14 are connected to a multi-outlet power socket 10 so as to connect to a power source. The router 12 can be a general wireless network sharer, with computers 101, 103 being able to access network data via the router 12 and obtain internet protocol addresses (IP addresses). The computers 101, 103 can connect to the Internet 18 through these network devices.

The aforementioned power socket 10 is simply an extension of a power source, and provides the required electric power to each network device wired to the power socket 10 without any recovery mechanism, such as a failover feature.

In view of the aforementioned network website installation, large data download, etc, with the requirement of long period of network connection, each network device needs to be powered-on for an extend length of time; but, however, such factors are usually not taken under commercial consideration for general house-hold network products, under unstable conditions, in case of occurrence of network disconnection, such as failure in the modem or network sharer (or router), network disconnection with remote computers would occur; usually, upon such a condition of network disconnection, the user needs to personally re-run dialup/connection software, or restart the power to the apparatus, in order to perform reset operation, thereby allowing the restoration of network connection to the original connection status. Due to the incapacity of the network-related devices to troubleshoot themselves, the problem of disconnection cannot be resolved immediately unless a user is present that can assist to clear such errors. The above limitation of requiring user intervention to reset and re-connect network connection is an area that can be improved.

SUMMARY OF THE INVENTION

In view that the prior art applied in a general home network environment does not provide a specific recovery mechanism, such as a failover feature, the preferred embodiments of the present invention, particularly within a power socket or Uninterruptible Power Supply (UPS), install a circuit for network connection status detection (i.e. a network connection detection circuit), and are able to restore network connection through power control upon detection of network abnormality.

The present invention provides an apparatus power restart method that utilizes network disconnection status detection, wherein network connection status can be accessed via a multi-outlet power control apparatus, thereby enabling the control of the power supply of each network devices, and the control includes the timing of power-on/off. Therein the method essentially uses the status of network connection to allow remote devices to automatically restart so as to facilitate trouble-shooting operations.

The major objective of the present invention is to provide a method which allows a user who is unable to personally restart each network device, to remotely access a power control apparatus, such as a multi-outlet socket with power control function and network connection function, so as to realize power control via network connection status. Therein, the power control apparatus may configure and control power supply (i.e. power on/off and the timing of power-on/off) to a plurality of network devices that are connected to the power control apparatus, and automatically restart each network device based on the power supply configuration once network disconnection occurs, so as to maintain the required network connection status.

An embodiment of an apparatus power restart method according to the present invention comprises supplying power to one or a plurality of network devices by a power control apparatus, establishing a network connection through the network devices; and then detecting the network connection status of the network devices via a network connection detection circuit of the power control apparatus. If the detected network connection status is normal, then the network devices continues to operate and the detecting of the network connection status continues; if the detected network connection status is abnormal, then each of the network devices is restarted, and the detecting of the network connection status continues. In one embodiment, the restarting of each of the network devices may be sequentially with time-delay based on a power supply configuration, so as to maintain the network connection.

DETAILED DESCRIPTION OF PREFERRED EMBODIMENTS

In a general network environment using Asymmetric Digital Subscriber Line (ADSL) comprising a modem (i.e. ATU- R), telephone lines are installed to the modem for connecting to a Public Service Telephone Network (PSTN), and the network lines of PSTN are installed connecting to internal network routers, thereby allowing users to access the Internet through one or more networks by means of transfers via the network gateway server. Additionally, although current Internet Service Providers (ISPs) further provide Fiber to the Home (FTTH) service, at present stage the aforementioned convention device or other similarly operated devices are still employed at user's end.

In view that such a general network environment may not offer specific mechanism for network recovery, such as a failover feature, the present invention hereby provides an apparatus power restart method that utilizes network disconnection status detection. Therein, particularly in a power control apparatus (e.g. a socket allowing power source forwarding, or a relevant power supply, power relay devices, and so forth), a network connection detection module is installed, and through a power supply configuration set up by a setting interface provided by a server module 331 of the power control apparatus 20, the present invention is able to control power switching based on network connection status.

Figure 1:
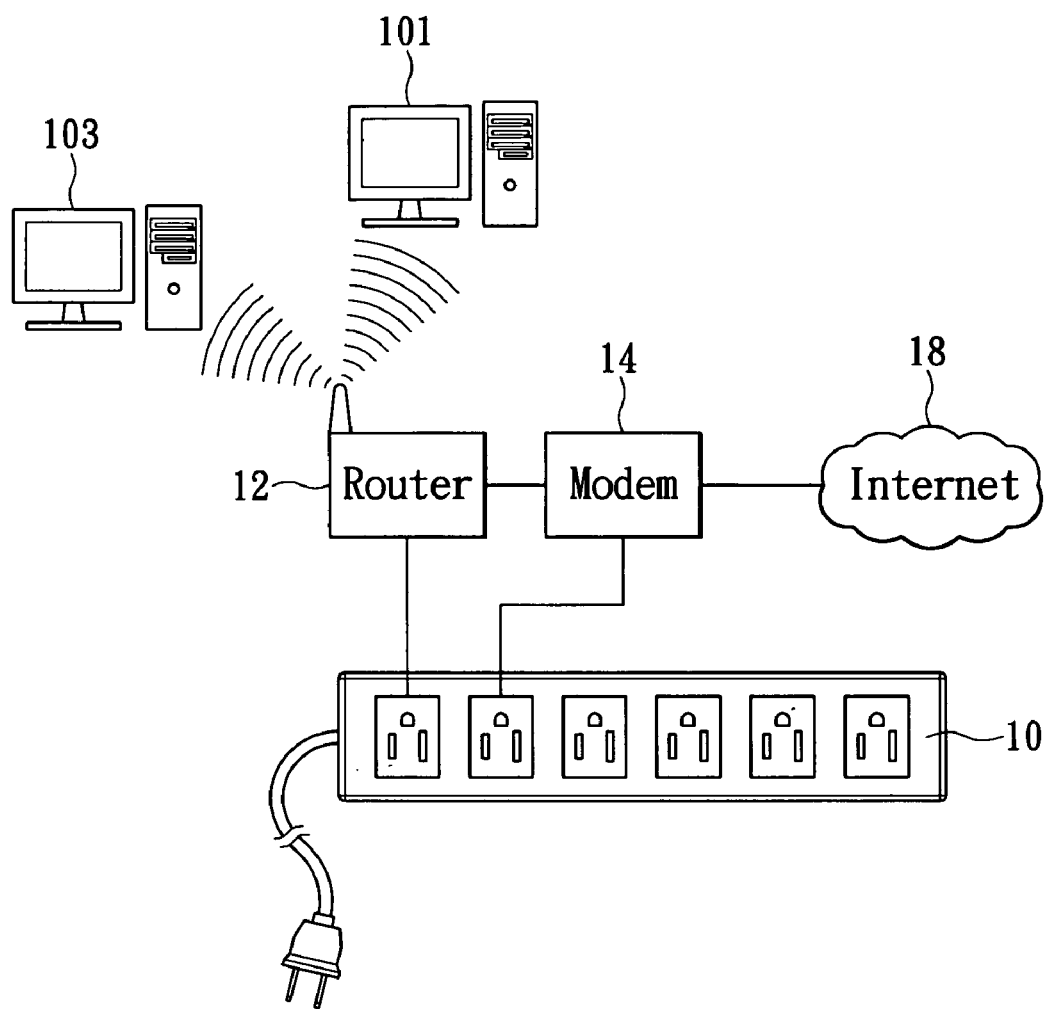
FIG. 1 is a schematic connection diagram of prior art network devices.
Figure 2:
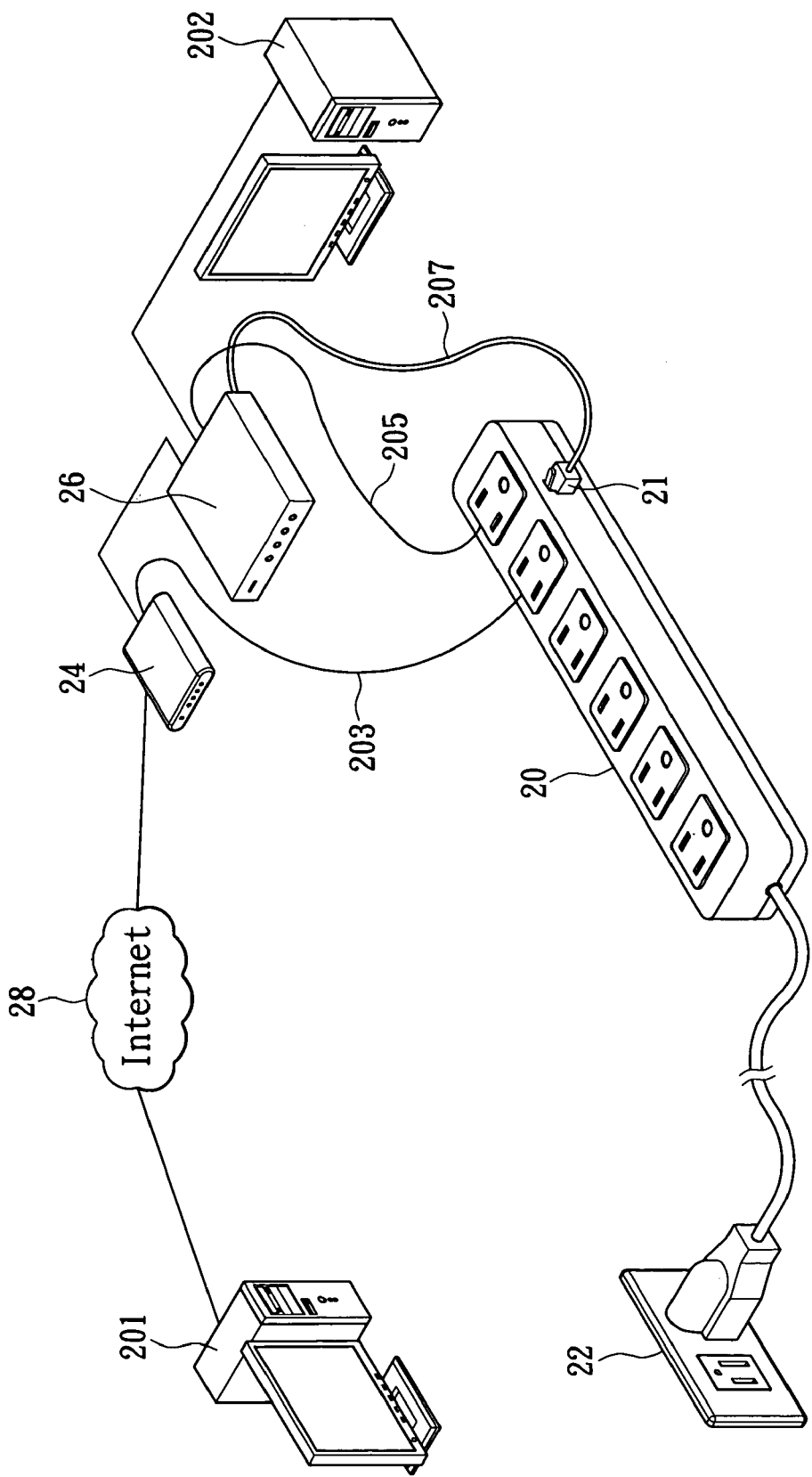
FIG. 2 is a schematic connection diagram of an embodiment of the power control apparatus utilized by the apparatus power restart method of the present invention, additionally peripheral devices connected to the power control apparatus are shown.

Refer now to FIG. 2, wherein a schematic connection diagram of an embodiment of the power control apparatus utilized by the apparatus power restart method according to the present invention is shown, additionally peripheral devices connected to the power control apparatus are shown. Therein, the core device is a power control apparatus 20 which is shown in FIG. 2 as a multi-outlet power socket allowing connections to multiple devices; in addition to sockets connectable to a plurality of devices, one end of the control apparatus 20 is connected to a power socket 22 for supply of power (e.g. utility electric power) through a power line, and the other end of the control apparatus 20 is installed with network connection port 21 which through a network connection 207 via a network line (such as RJ-45), may allow connection to various network devices such as modem 24 and router 26, thereby connecting to the Internet 28. In another embodiment, a network module (not shown) in the power control apparatus can support wireless network, enabling connection to other network devices by using wireless network.

Under such a connection arrangement, which consists of both power connection and network connection, the power control apparatus 20 may forward power through power lines 203, 205 to supply the required electric power to the modem 24 and the router 26, a remote computer 201 can connect to the modem 24 at local end by way of the Internet 28, or alternatively a near end computer 202 can connect through the router 26 and connect to the power control apparatus 20. In other embodiments, the modem 24 can provide routing function, while other computing devices or network devices at local end may also connect to the Internet 28 through the present architecture by way of other routers or hubs not shown in the present figure of FIG. 2.

The essential purpose of the present invention is in that, under the circumstances when network connection fails but users are not able to restart each network device in person, it is possible to use the control circuit 31 installed within the power control apparatus 20 (see FIG. 3) to restart the power to each network device through the power lines 203, 205 in order to maintain the network connection.

The power control apparatus 20 provides a function of network connection capable of wired (having network connection port 21) and wireless approaches, connecting to each network device (i.e. modem 24 and router 26) via the aforementioned network connection 207, to the Internet 28 or to the local area network of near end computer 202. In actual application, it is possible to connect to the power control apparatus 20 through the Internet 28 by using the remote computer 201; or connect to the power control apparatus 20 through the router 26 by using the near end computer 202; or directly access or operate the power control apparatus 20 through the network connection port 21 by way of the network connection by using the near end computer 202. The objective is to set up power supply configurations for each network device connected to the power control apparatus 20 by means of a setting interface provided by a server module 331 of the power control apparatus 20 (see FIG. 3), so as to automatically perform sequentially time-delayed power restart of each network device based on the power supply configurations upon occurrence of network disconnection so as to maintain network connection status.

The preferred embodiments of the present invention use a power control apparatus 20 having remote control function to connect to various electronic devices, and restart one or more network devices through the mechanism of network connection status detection upon network failure, thus enabling normal network connection operations of each of the network devices.

Figure 3:
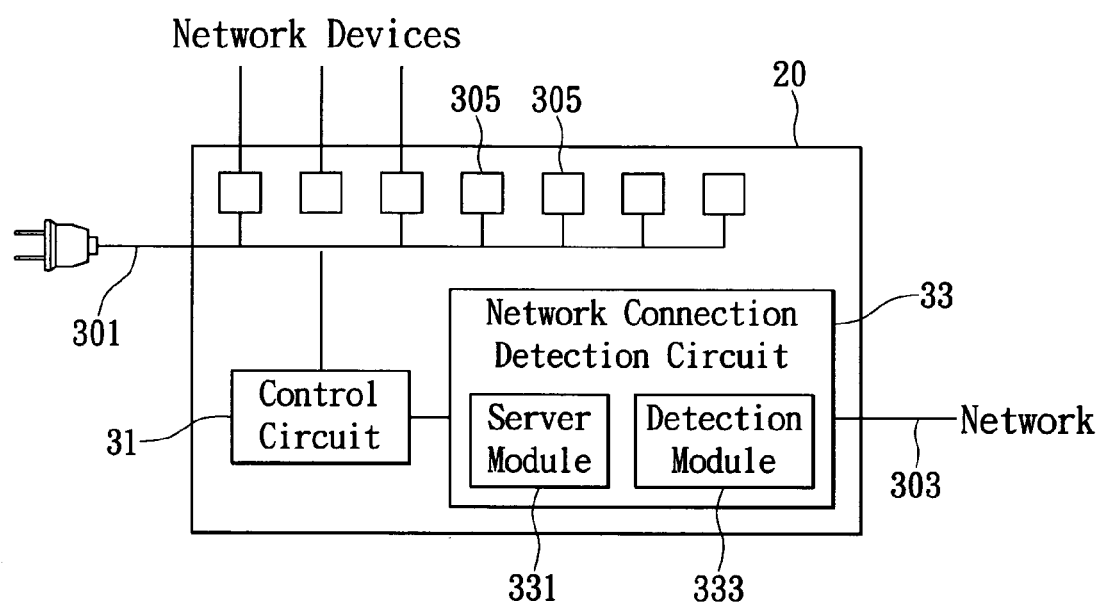
FIG. 3 is a schematic diagram of an embodiment of the power control apparatus utilized by the apparatus power restart method according to the present invention.

With reference to FIG. 3, that shows a schematic diagram of a preferred embodiment of the power control apparatus 20 utilized by the apparatus power restart method according to the present invention. The power control apparatus 20 has a plurality of connections consisting of both power connection and network connection. Therein the connection to a power source is through the power connection 301; the connection to a network is through the network connection 303, which includes the local area network of the near end computer 202 and the Internet 28 connected via each of the network devices (i.e. modem 24 and router 26); power connections to various electronic devices are through one or more sockets 305, in which, for the present embodiment, the socket 305 is used to provide the required power for one or more of the network devices.

The power control apparatus 20 is installed with a control circuit 31 and a network connection detection circuit 33, wherein the network connection detection circuit 33 is installed with a server module 331 for providing remote logging function and a detection module 333 for enabling network connection detection function.

The network connection detection circuit 33 is electrically connected to the control circuit 31, for detecting network connection status, and upon detection of abnormal network connection status, generating a control signal to send to the control circuit 31. Such abnormalities may include any possible situations such as network disconnection or unstable connection, or bad network device operations, etc.

One preferred embodiment of the server module 331 of the network connection detection circuit 33 can be a WWW website server, allowing users to enter into a setting interface in the form of a webpage through a web browser application to set up; or the server module 331 can be other types of servers, comprising commonly used server mechanisms for remote control like Secure Shell (SSH), telnet and so on, or other dedicated setting methods that may enable users to perform configuration using command line.

The network connection detection circuit 33 can detect the network connection status through the detection module 333 installed therein. There are many possible approaches for network detection, and since the power control apparatus 20 establishes the network connection with the Internet 28 via the above-mentioned network devices (e.g. router 26, modem 24 etc.), it is possible to test the network connection status by means of network connection detection, such as the detecting of data packet volume and flow of the network connection between the power control apparatus 20 and one or more remote servers.

Specifically, the mechanism for detecting network connection by applying the power control apparatus 20 with remote control consists of transferring the packets requested by Internet Control Message Protocol (ICMP), and acknowledging the connection status by the status of the packet responded by the server. For example, a ping program can be used to issue ICMP request packets to multiple remote servers that functions function on a permanent basis with no down time, which may be set up according to the setting configuration of the server module 331. Therein, based on the setting configuration, when response error consistently occurs and thus exceeds a preset threshold value, the server module 331 of the network connection detection circuit 33 determines the network connection as being erroneous. At this moment, the network connection detection circuit 33 accordingly generates a control signal and sends the control signal to the control circuit 31. The control circuit 31 has a circuit designed for power restart switching, which is controlled by the control signal, so as to sequentially with time-delay restart the connected network devices based on the power supply configuration set up for each of the network connection devices, thereby enabling maintenance of normal operation status.

The aforementioned ping program is a computer network tool, whose operation is to send an ICMP echo request packet toward a target host, and then wait to receive an echo response packet, wherein the ping program estimates the packet loss rate and round trip time in accordance with the duration and numbers of successful responses; under the circumstances that no presence of firewall is there to deliberately exclude such ICMP packets, the ping program can be used to test the status of network connection with a specific host.

In addition to detection of the network connection failure, it is also possible, with the existence of network connection, to determine network quality based on the said packet loss rate and round trip time; in case of presence of any abnormal event, control circuit 31 of the power control apparatus 20 can restart each network device according to the power supply configurations set up by the setting interface provided by the server module 331, wherein the power supply configurations are based on specific determination principles in order to keep network quality to an operable level.

Other than using the aforementioned ping program to ping multiple IP addresses, other methods of network connection status detection may be utilized such as by means of broadcast packet detection, DNS inquiry, routing inquiry, and so on.

In a preferred embodiment, the power control apparatus 20 includes a control circuit 31 electrically connected to the aforementioned one or more sockets 305 The power control functionality can be functioned with a plurality of switches (not shown) with corresponding sockets 305 and the power source. The switches are operated conjunctively with a power reset switching circuit (not shown) in the control circuit 31. Therein, the control circuit 31 receives the control signal generated by the network connection detection circuit 33 upon occurrence of abnormal network connection status, thereby accordingly controls the corresponding switching circuit to sequentially restart the network device connected on each socket, wherein the sequential restart can be either with a time delay or simultaneously simultaneous.

As for the sequence of power restart operation in each network device, it can be, for example, first restart the ADSL modem; then, after an estimated duration of power restart, restart next the router (or possibly an IP sharer). If the network has other hubs, they are restarted next. If the power control apparatus 20 is connected to devices belonging to different network segments, it is possible to selectively restart the network devices located in a network segment illustrating abnormal network status.

Figure 4:
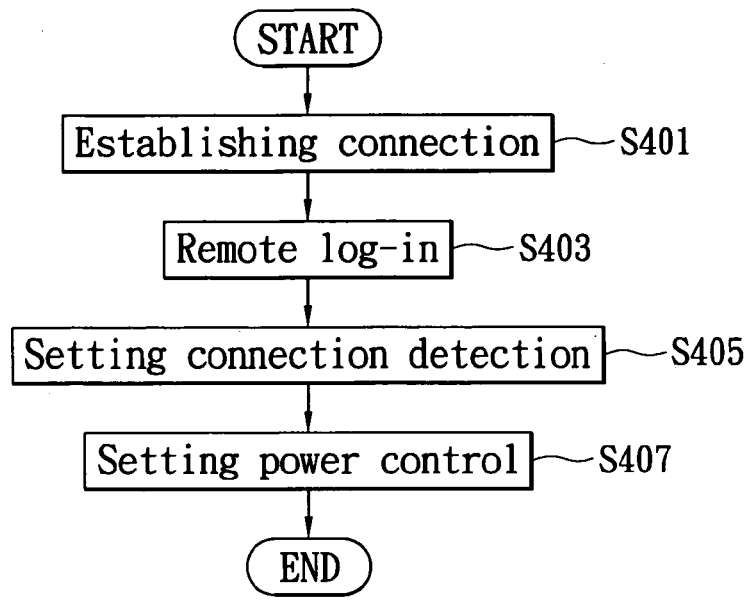
FIG. 4 is a flowchart of an embodiment of logging in the power control apparatus by using remote connection according to the present invention.

FIG. 4 shows a flowchart of an embodiment of accessing the power control apparatus by using the remote connection according to the present invention.

Refer to FIG. 4 in conjunction with FIGS. 2 and 3. In accordance with the connection embodiment of the aforementioned power control apparatus 20 and peripheral devices, power is supplied to each network device from a power source through the power control apparatus 20; herein the network connection detection circuit 33 further connects to the Internet 28 and remote servers by way of each network device (i.e. modem 24 and router 26) via network connections. The workflow starts at S401, wherein, after starting the each network device, the modem 24 automatically performs connection procedure with a network gateway, and The connection procedure differs with respect to the various network architectures. A common home-used modem (i.e. modem 24) is generally connected to servers installed in an ISP control center, and subsequently the router 26 is connected to the modem 24 to complete Internet connection procedures through authentications and connection programs therein, allowing each computer system located at near end (i.e. near end computer 202) to connect to the Internet 28.

The present invention particularly provides a server module 331 within network connection detection circuit 33 installed inside the power control apparatus 20 in order to allow users to log in remotely (step S403), which includes logging in the power control apparatus 20 by way of each network device (i.e. modem 24 and router 26) through the Internet 28, or logging in by means of the local area network via computers located at near end (i.e. near end computer 202). After required authentications and log-in procedures, it is possible to use a setting interface, provided by the server module 331, to perform setting and other operations, which in the preferred embodiment is shown as being accomplished through a web browser.

The setting may comprise connection detection setting (step S405) and power control setting (i.e. power supply configuration) (step S407).

The connection detection setting is essentially to set the configuration for determining network connection status. Taking the aforementioned method of sending ICMP request packet and determining network connection status based on the response packet for example, the connection detection setting is required to set under what circumstances a network will be determined to be abnormal, such as failing to receive and response packet in a specific duration of time, under such circumstances the network is determined to be abnormal; or, after continuous pings toward a plurality of remote servers with no response packet received from a certain number of server, then the network is determined to be abnormal; or when the packet loss rate exceeds a certain threshold value, then the network is determined to be abnormal; or the time interval between former and later response packets is greater than a threshold value, then the network is determined to be abnormal. If one of the aforementioned conditions or a combination of aforementioned conditions is satisfied, then a control signal will be generated and sent to the control circuit 31 to request power restart in each network device.

The power supply configuration consist of setting the order of power restart in each network device, usually restarting initially the modem 24; and then after a duration of time for modem restart, subsequently other network devices; or alternatively, simultaneously restarting the network devices, wherein various connection programs in each network device are executed repeatedly until the connection is successfully completed.

Figure 5:
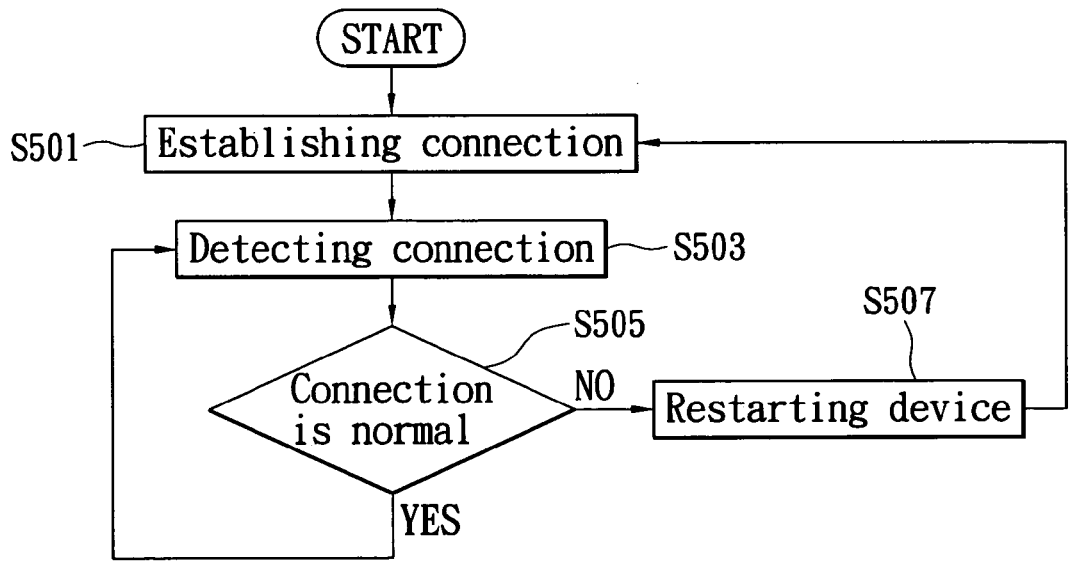
FIG. 5 is a flowchart of an embodiment of the apparatus power restart method utilizing network disconnection status detection according to the present invention.

FIG. 5 shows a flowchart of an embodiment of the apparatus power restart method utilizing network disconnection status detection according to the present invention.

The respective network devices (i.e. modem 24 or router 26) electrically connected to a power control apparatus 20 are firstly started. The power is supplied to one or more network devices and the power control apparatus 20. Furthermore, a network connection is established (step S501). The power control apparatus 20 connects to the network by means of each of the network devices. After that, the network connection detection circuit 33 in the power control apparatus 20 detects the status of network connection to the Internet 28; that is, the status of network connection indicates whether each network device is normally operating (step S503). The preferred embodiment for detection can be referred to the description of FIG. 3. The ping program sends ICMP request packets to a plurality of remote servers that function permanently with no downtime, and determines whether or not the connection is normal based on a connection detection setting that determines the normality or abnormality of the network connection status (step S505). Therein, the connection detection setting is set up by a setting interface provided by the server module 331, as described previously utilizing FIG. 4.

If any setting for various network connection status is determined according to the connection detection setting, then the method is to determine abnormality in the network connection, and the network connection detection circuit 33 generates a control signal to the control circuit 31 for driving each network device (i.e. modem 24 and router 26) to restart. In which, the steps for restarting the devices are executed by the control circuit 31. Then step S507 is performed to restart the network devices sequentially in a predetermined order, in time-delay, or simultaneously based on preset power supply configuration, and reestablishing the connection (step S501). After that, the method continues to perform the network connection status detection.

In case there is no occurrence of the aforementioned network abnormal events, indicating that the network connection operates normally, then the method returns to step S503 to continue the network connection detection.

In summary, the present invention discloses an apparatus power restart method utilizing network disconnection status detection, which, through a network detection mechanism and a control circuit installed in a power control apparatus effectively equivalent to a general multi-outlet socket, enables the automatic restart of network devices upon network disconnection, so as to maintain network connection status.

The descriptions illustrated supra simply set forth the preferred embodiments of the present invention without any intention to thereby restrict the scope thereof. All structural changes and modifications equivalent in effects made in accordance with the detailed descriptions and appended drawing of the present invention are reasonably deemed as being encompassed in the scope of the present invention defined by the following claims.

What is claimed is:

1. An apparatus power restart method utilizing network connection status detection, comprising:
   supplying power to one or more network devices by a power control apparatus, and establishing a network connection through the one or more network devices;
   detecting a network connection status through the one or more network devices by determining whether the network devices are connected to one or more remote servers on basis of Internet Control Message Protocol (ICMP)-based request packets sent by a server module installed in the power control apparatus over Internet via a network connection detection circuit of the power control apparatus with a reception of corresponding response packets indicative of connection status acknowledgement;
   if the detected network connection status is normal, continuing to operate the one or more network devices, and continuing to detect the network connection status; and
   if the detected network connection status is abnormal, generating a control signal by the network connection detection circuit of the power control apparatus for restarting the one or more network devices, while continuing to detect the network connection status.

2. The apparatus power restart method according to claim 1, wherein the control signal is received by a control circuit of the power control apparatus so as to restart the one or more network devices.

3. The apparatus power restart method according to claim 2, wherein the step of restarting the one or more network devices is performed by simultaneously restarting the one or more network devices.

4. The apparatus power restart method according to claim 2, wherein the step of restarting the one or more network devices is performed by restarting each network device in a predetermined sequence with a time-delay.

5. The apparatus power restart method according to claim 4, wherein the order of power restart is set by an external computer system which uses the network connection to connect to the power control apparatus.

6. An apparatus power restart method utilizing network connection status detection, comprising:
   supplying power to one or more network devices by a power control apparatus, and establishing a network connection to a server module installed in the power control apparatus through the one or more network devices;
   detecting the network connection status through of the one or more network devices via a network connection detection circuit of the power control apparatus;
   if the detected network connection status is normal, continuing to operate the one or more network devices, and continuing to detect the network connection status; and
   if the detected network connection status is abnormal, then restarting the one or more network devices, and continuing to detect the network connection status.

7. The apparatus power restart method according to claim 6, wherein the step of detecting the network connection status is performed by detecting the network connection between the one or more remote servers and the server module installed in the power control apparatus over Internet.

8. The apparatus power restart method according to claim 7, wherein initially a plurality of Internet Control Message Protocol (ICMP) request packets are sent to the one or more remote servers, then the reception of response packets for connection status acknowledgement is awaited.

9. The apparatus power restart method according to claim 6, wherein when the detected network connection status is abnormal, the network connection detection circuit of the power control apparatus generates a control signal for driving the one or more network devices to restart.

10. The apparatus power restart method according to claim 9, wherein the control signal is received by a control circuit of the power control apparatus so as to restart the connected one or more network devices.

11. The apparatus power restart method according to claim 10, wherein the step of restarting the one or more network devices is performed by simultaneously restarting the one or more network devices.

12. The apparatus power restart method according to claim 10, wherein the step of restarting the one or more network devices is performed by restarting each network device in a predetermined sequence with a time-delay.

13. The apparatus power restart method according to claim 12, wherein the predetermined sequence for restarting the network devices is set by an external computer system which uses the network connection to connect to the power control apparatus.

* * * * *